United States Patent [19]

Meyer, Jr. et al.

[11] 3,919,176
[45] Nov. 11, 1975

[54] WATER-DISPERSIBLE POLYOLEFIN COMPOSITIONS USEFUL AS HOT MELT ADHESIVES

[75] Inventors: Max F. Meyer, Jr.; Richard L. McConnell; Frederick B. Joyner, all of Kingsport, Tenn.

[73] Assignee: Eastman Kodak Company, Rochester, N.Y.

[22] Filed: Oct. 1, 1973

[21] Appl. No.: 402,658

[52] U.S. Cl...... 260/78.4 D; 117/161 VZ; 161/247; 260/23 R; 260/29 EP; 260/29 UA; 260/33.2 R; 260/78.5 T; 260/78.5 HC; 260/94.76 D; 260/876 R; 260/897 B
[51] Int. Cl.² .................. C08F 18/14; C08G 63/00; C08K 5/06; C08F 218/14
[58] Field of Search .. 260/78.4 D, 78.5 T, 78.5 HC, 260/94.76 D, 876 R, 897 B, 29.2 UA, 29.2 EP, 23 R, 33.2 R; 161/247–251

[56] References Cited
UNITED STATES PATENTS

| | | | |
|---|---|---|---|
| 2,938,887 | 5/1960 | Weiss | 260/78.5 HC |
| 3,392,155 | 7/1968 | Muskat | 260/78.5 |
| 3,437,643 | 4/1969 | Zimmerman | 260/78.5 |
| 3,481,910 | 12/1969 | Brunson | 260/78.4 D |

*Primary Examiner*—Joseph L. Schofer
*Assistant Examiner*—Herbert J. Lilling

[57] ABSTRACT

This invention relates to water-dispersible polyolefin compositions. In particular, it relates to water-dispersible polyolefin compositions useful as hot melt adhesive compositions. These hot melt adhesives have improved repulping properties and are produced from low-cost materials and, in addition, are suitable for bonding a variety of materials. The improved repulpability of the hot melt adhesive is achieved by using an esterified carboxylated polyolefin in formulating the hot melt adhesives.

19 Claims, No Drawings

WATER-DISPERSIBLE POLYOLEFIN COMPOSITIONS USEFUL AS HOT MELT ADHESIVES

This invention relates to water-dispersible polyolefin compositions and their process of preparation. One aspect of this invention concerns a water-dispersible polyolefin composition useful as a hot melt adhesive. A particular aspect of this invention concerns an esterified carboxylated polyolefin composition and water-dispersible hot melt adhesives containing this modified polyolefin.

Hot melt adhesives produce a bond by mere cooling as distinguished from crosslinking or other chemical reactions. Prior to heating, the hot melt adhesives are solids that can be prepared in bulk or pellet form for ease of handling. Upon heating, the hot melt adhesive composition melts and flows freely for application to a substrate. Since the hot melt adhesives of the present invention are thermoplastic rather than thermosetting, and thus remeltable, they can be applied to a particular substrate and later remelted to form a hot melt bond between this substrate and another substrate.

Hot melt adhesives are useful for bonding various substrates together such as wood, paper, plastics, and textiles, as well as other materials. One use for which they are well suited is the fabrication of corrugated paper board. Hot melt adhesives useful for producing corrugated paper board must have high bond strength under conditions of shock, stress, high humidity and extremes of temperature encountered in transportation and storage. In addition, the melt point, wetting time, initial tack, setting time, pot life and general handling qualities on automatic corrugated board machinery are essential considerations.

It is a general practice in the paper industry to recover the used and waste corrugated material and repulp the material for use in the preparation of other materials such as cardboard. The use of polyolefin hot melt adhesives to close or seal cartons made from corrugated material has presented problems in regard to repulpability of the used boxes or cartons.

Repulping involves fiberizing or disintegrating the waste paper in water to form a slush of separated fibers in a beater of the hollander type such as Hydropulper, Vortex beater or the like. For certain applications refining may be employed instead of beating. Refining is similar to beating in that essentially the same physical changes occur but to a greater degree, in order to produce more highly processed grades of paper. Fillers, sizers and color pigments may be added directly to the stock from beating or finishing.

In one method the stock containing any added materials is formed into a wet belt which essentially involves running a dilute suspension of fibers onto the surface of a moving endless belt of wire cloth. This is the Fourdrinier process. Part of the water drains by gravity, part by pressure. The remaining water is removed in a dryer section by additional pressure and heat to form paper web or sheet.

It has been found that suitable polyolefin based hot melt adhesives, that is, those that operate well on box closing machinery and produce satisfactory sealed corrugated boxes, when repulped and employed in a process such as the Fourdrinier process produce some large particles that tend to stick in and block the openings in the wire belt. Therefore, after a few revolutions of the endless wire belt, it becomes seriously clogged and unusable. Other smaller particles either pass through the wire belt or are incorporated into the wet sheet and become what is known in the art as shiners. It is therefore apparent that it would be an advance in the state of the art to provide a polyolefin composition which forms repulpable hot melt polyolefin adhesives which have the desirable properties of polyolefin adhesives and can be used on paper products, such as cardboard, which can also be repulped.

It is, therefore, an object of the present invention to provide a novel polyolefin composition.

Another object of this invention is to provide new hydrophylic polyolefin compositions that can be used as repulpable hot melt adhesives.

A further object of the invention is to provide new hydrophylic polyolefin compositions which are suitable for use as antiskid coatings and as contact adhesives for polyesters, metals and glass.

Another object of this invention is to provide new hydrophylic polyolefin compositions which by virtue of their hydrophylic-hydrophobic balance can be utilized or applied as coatings or adhesives in the form of a hot melt adhesive or as a dispersion in water.

One further object of the invention is to provide new hydrophylic polyolefin compositions that can be used as rewettable contact adhesives.

In accordance with the present invention, we have found that water-dispersible polyolefin compositions particularly useful as hot melt adhesive compositions for use on repulpable paper products can be prepared from esterified carboxylated polyolefins. The esterified carboxylated polyolefin is prepared by reacting a carboxylated polyolefin having a saponification number of from about 10 to about 160 with from 10 to 100 mole percent of monohydroxypolyether compounds of the formula:

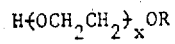

wherein R is a hydrocarbyl radical containing 1 to 24 carbon atoms and $x$ is an integer from 2 to 500.

The carboxylated polyolefins useful in the present invention are prepared by reacting low viscosity homopolymeric and copolymeric poly-α-olefins of monoolefins containing 2 to 12 carbon atoms with an unsaturated polycarboxylic acid, anhydrides or esters thereof. Generally, the reaction is carried out in the presence of a free radical source. These homopolymeric or copolymeric low viscosity poly-α-olefins are prepared by thermally degrading conventional high molecular weight α-olefin polymers prepared by conventional polymerization processes. For example, one such suitable conventional polymer is the highly crystalline polypropylene prepared according to U.S. Pat. No. 2,969,345. Thermal degradation of conventional homopolymers or copolymers is accomplished by heating them at elevated temperatures causing the polymer chain to rupture apparently at the points of chain branching of the polymeric material. The degree of degradation is controlled by reaction time and temperature to give a thermally degraded low molecular weight crystallizable polymeric material having a melt viscosity range from about 100–50,000 cp. at 190°C. (ASTM-D1238-57T using 0.04 ± 0.0002 inch orifice) and an inherent viscosity of about 0.1 to 0.5 [Schulken and Sparks, *Journal Polymer Science* 26, 227, (1957)]. By carefully controlling the time, temperature and agitation, a thermally degraded poly-α-olefin of relatively narrower molecular weight range than the starting high molecular weight polymer is obtained. The degradation is carried out at a temperature from 290°C. to about 425°C. These low viscosity poly-α-olefins prepared by thermally degrading conventional high molecular weight polymers are not emulsifiable as such, but upon reacting them with unsaturated polycarboxylic acids, anhydrides or esters thereof, thereby increasing the acid number and saponification number of the thermally degraded polymer are suitable as hot melt adhesives and are emulsifiable. However, these carboxylated polymers are not dispersible in a 2% alkali solution at 70°C.

The low viscosity poly-α-olefins which are useful for purposes of this invention are characterized by having One method for the determination of saponification number of maleated polypropylene is as follows: Weigh approximately 4 g. of the sample into a 500 ml. alkali-resistant Erlenmeyer flask and add 100 ml. distilled xylene. Heat under a reflux condenser for 1 hour. Cool the solution to 75°C. or less, and add from a buret 30 ml. standardized 0.10 N KOH in ethyl alcohol. Heat under reflux for 45 minutes. Cool and add from a buret standardized 0.10 N CH$_3$COOH in xylene until the mixture is acid to phenolphthalein. Add at least 1 ml. excess CH$_3$COOH. Reheat the solution under reflux for 15 minutes. Remove from heat, add 5 ml. water, and titrate to a faint pink end point with 0.10 N KOH in ethyl alcohol. Run a blank in this manner using the same amounts of reagents and the same heating times.

$$\frac{\text{(For sample)} \quad\quad\quad \text{(For blank)}}{\text{g. Sample}} \text{(ml. KOH} \times \text{N) (ml. CH}_3\text{COOH} \times \text{N)} - \text{(ml. KOH} \times \text{N) (ml. CH}_3\text{COOH} \times \text{N)} \times 56.1 = \text{Sap. No.}$$

Calculation:

a melt viscosity of less than about 100 to 50,000 cp. as measured at 190°C. (ASTM-D1238-57T using 0.04 ± 0.0002 inch orifice). These low viscosity poly-α-olefins are reacted with unsaturated polycarboxylic acids, anhydrides or esters thereof at temperatures generally less than 300°C., preferably from about 150°-200°C. in the presence of free radical sources. Suitable free radical sources are, for example, peroxides such as ditertiary butyl peroxide, tertiary butyl hydroperoxide, cumene hydroperoxide, p-methane peroxide, 2,5-dimethyl-2,5-ditertiary butyl peroxyhexane, p-menthane hydroperoxide compounds or azo compounds, such as azobis (isobutyronitrile), or irradiation sources. Suitable irradiation sources include, for example, those from cobalt, uranium, thorium, and the like and ultraviolet light. Preferably, about 1 to 10% organic unsaturated polycarboxylic acid, anhydride or esters thereof, based on the weight of the low viscosity polyolefin, can be used in the invention. The amount of peroxide or free radical agent used is generally quite low being of the order of about 0.01 to about 0.5% based on the weight of the low viscosity poly-α-olefin. The reaction may be carried out either in a batchwise or in a continuous manner with contact times in the order of about 2 minutes to about 2 hours. The reaction of polyethylene must be carried out in the absence of oxygen, preferably in an inert nitrogen atmosphere. The reaction of polypropylene and other α-olefins preferably is carried out in an inert atmosphere. Suitable unsaturated polycarboxylic acids and anhydrides are, for example, maleic acid, maleic anhydride, fumaric acid, citraconic anhydride, aconitic anhydride and itaconic anhydride. Suitable esters are, for example, the half or full esters derived from maleic and fumaric acid such as methyl ethyl fumarate, dimethyl maleate, dimethyl fumarate, methyl ethyl maleate, dibutyl maleate, dipropyl maleate, and the like, or those compounds which form these compounds at elevated reaction temperatures such as citric acid, for example. These modified low molecular weight poly-α-olefin compositions have a melt viscosity of 100-50,000 cp. at 190°C. and a saponification number of at least 10 to 160, preferably about 20-60. It has been observed in the present invention that the melt viscosity of the product increases slightly. This increase in melt viscosity may be due to a slight degree of crosslinking or to copolymerization of the wax material with maleic anhydride.

The unreacted, unsaturated polycarboxylic acid can be separated from the reaction mixture by purging the reaction mixture with an inert gas while the melt temperature is between 200° and 300°C. After the unreacted unsaturated polycarboxylic acid has been removed, the modified poly-α-olefin can be further purified by vacuum stripping, solvent extraction, or dissolving in an aqueous medium and isolated by removing the solvent or water.

The monohydroxypolyether compounds which can be used to prepare the hydrophilic polyolefin compositions with the improvements noted above have the following structure:

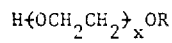

wherein R is a hydrocarbyl radical containing 1 to 24 carbon atoms and $x$ is 2 to 500. Thus, R may be methyl, ethyl, propyl, butyl, pentyl, hexyl, octyl, nonyl, dodecyl, octadecyl, phenyl, cyclohexyl, octylphenyl, nonylphenyl, naphthyl, biphenylyl and the like. Such monohydroxypolyether compounds include ethoxylated alcohols useful as nonionic surfactants which may be aliphatic or aromatic in character. These alcohols are represented by the following general formulae:

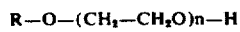

and

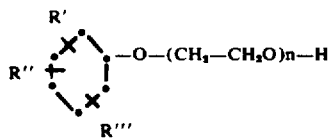

wherein R and R' are alkyl radicals containing from 8 to 24 and preferably 8 to 16 carbon atoms; R" and R''' are hydrogen or the alkyl radicals represented by R or R'; and $n$ represents the degree of oxyethylation of the alcohol which ranges from about 6 to about 150 and preferably about 15 to 30 moles of ethylene oxide per mole of the phenolic or branched or straight chain alcohol from which the ethoxylated alcohols are derived.

It will be appreciated that R', R" and R''' may be the same or different alkyl radicals. The following alkyl radicals are representative of those which may be present in the ethoxylated alcohol: the straight or branched groups such as octyl, nonyl, decyl, dodecyl, tetradecyl, pentadecyl, hexadecyl, octadecyl, eicosyl, heneicosyl, docosyl, tricosyl, tetracosyl, and the like, and the cyclic groups such as cyclooctyl, ethylcyclohexyl, ethylcyclooctyl, 1,1,2-trimethylcycloheptyl, 1,4-dimethylcyclohexyl, and the like. Exemplary of some of the ethoxylated alcohols that are commercially available and which are defined by the above formulae are the "Igepals" produced by General Aniline and Film Corporation, e.g., octylphenoxypoly(ethyleneoxy)ethanols, nonylphenoxypoly(ethyleneoxy)ethanols, dioctylphenoxypoly(ethyleneoxy)ethanols, dinonylphenoxypoly(ethyleneoxy)ethanols, dodecylphenoxypolyl(ethyleneoxy)ethanols, tridecyloxpoly(ethyleneoxy)ethanols, and the like.

The esterification reaction may be conducted in a solvent medium or in a melt phase reaction. Suitable solvents include theta solvents such as diphenyl ether for polyethylene, ketones such as methylethyl ketone, aliphatic hydrocarbons such as hexane, and aromatic hydrocarbons such as benzene or toluene. Because the solvents are often difficult to remove from the ester products, the melt phase reaction is preferred. This reaction usually is conducted in solvents at temperatures of from about 40 to about the boiling point of the solvent for periods of from about 30 minutes to about two hours. In a melt phase reaction the temperature ranges from the melting point of carboxylated polyolefin to about 250°C. Higher temperatures are undesirable as degradation and crosslinking occur. The degree of esterification of the carboxylated polyolefin is controlled by the amount of ethoxylated alcohol, reaction time and reaction temperature.

The terms "dispersible" and "repulpable" as used herein refer to the dispersion of the polymer in 70°C. water or 70°C. 2% NaOH solution to the extent that the polymer will pass through an ASTM 40-60 coarse grade sintered glass funnel as described in the dispersibility procedure in Example 1.

This invention will be further illustrated by the following examples although it will be understood that these examples are included merely for purposes of illustration and are not intended to limit the scope of the invention.

EXAMPLE 1

One hundred grams of a propylene/1-butene copolymer (Ring and Ball softening point of 105°C., melt viscosity at 190°C., 3870 cp.) is placed in a 3-neck, 500 ml. round bottom flask fitted with a stirrer, steam condenser and dropping funnel. The system is purged with nitrogen and heated to 200°C. using a metal bath. The polymer is stirred for 15 minutes after melting to insure that a reaction temperature of 200°C. is attained. Maleic anhydride (13.1 g.) and 0.8 ml. (0.7 g.) of 2,5-dimethyl-2,5-di-t-butylperoxyhexane (available commercially as Lupersol 101) are dissolved in acetone (total volume of about 23 ml.) and added dropwise over a period of 30 minutes with high speed stirring. The reaction is maintained at 200°C. with high speed stirring for 1 hour after addition of the reactants. The polymer is vacuum stripped (approximately 0.2 mm.) at 130°C. for 15 hours to remove all unreacted maleic anhydride. The carboxylated polymer is then stabilized by coating the polymer pellets with 0.2% dilauryl thiodipropionate and 0.2% bismethylheptadecyl-p-cresol. The carboxylated polymer has a saponification number of 56 and a melt viscosity of 2425 cp. at 190°C.

The dispersion factor or dispersibility of this polymer in 2% aqueous NaOH solution at 70°C. is determined as follows:

One gram of polymer is blended in a Waring Blender for 10 minutes at high speed at 70°C. in 2% aqueous NaOH solution (600 ml.) and filtered hot through a weighed 150 ml. ASTM 40-60 coarse grade sintered glass funnel.

The amount of polymer retained on the funnel (after drying) indicates the degree of dispersibility.

Dispersibility = 1.0 —weight of polymer on filter
1.0 = complete dispersion
0.5 = 50% dispersion
0 = no dispersion The dispersibility of this polymer is zero.

EXAMPLE 2

The carboxylated propylene/1-butene copolymer described in Example 1 is reacted with nonylphenoxypoly(ethyleneoxy)ethanol (mol. wt. approximately 465) at 200°C. for 20 minutes in the melt phase. The degree of reaction (based on carboxyl content) is varied from 100% down to 9.45% as shown below. The modified polymer is thermoplastic and fluid with little change in melt viscosity compared to the carboxylated polymer. The dispersibility of these modified polymers is determined as described in Example 1 and, as shown in Table 1 below, the hydrophylicity and dispersibility of the carboxylated polymer are significantly increased as the degree of modification increases without any crosslinking of the polymer.

Table 1

| Degree of Modification of Maleated Polymer, Mole % | Dispersion Factor |
|---|---|
| 100 | 0.91 |
| 47.3 | 0.56 |
| 18.9 | 0.24 |
| 9.45 | 0.07 |
| 0 | 0 |

Saponification No. of the maleated polymer is 56.

These modified propylene/1-butene copolymers having a dispersion factor of 0.90 or higher are suitable for use as repulpable hot melt adhesives for paper and corrugated board and as adhesives for polyester film.

EXAMPLE 3

The procedure of Example 2 is repeated with a monohydroxy poly(ethylene glycol) having a molecular weight of about 20,000 (x = 450) and a carboxylated poly-1-pentene polymer having a saponification number of 25.1 and a melt viscosity at 190°C. of 13,400 cp. A dispersion factor of 0.95 is obtained by reacting 11.1% of the available carboxyl groups with the monohydroxypolyether. This material is suitable for use as a repulpable adhesive with paper and corrugated board.

EXAMPLE 4

The procedure of Example 2 is repeated with methylphenoxypoly(ethyleneoxy)ethanol, butylphenoxypoly(ethyleneoxy)ethanol, hexylphenoxypoly(ethyleneoxy)ethanol, and octylphenoxypoly(ethyleneoxy)ethanol wherein the number of ethyleneoxy repeating groups is varied from 5 to 10. The results are comparable to those obtained in Example 2.

EXAMPLE 5

The procedure of Example 2 is repeated with monohydroxy polyethers wherein R is methyl, butyl, hexyl, phenyl, bisphenylyl and naphthyl and the number of ethyleneoxy repeating groups is 7. The dispersion factor after complete reaction of the grafted carboxyl groups is 0.9 or higher and each composition is suitable as a repulpable adhesive.

EXAMPLE 6

The carboxylated propylene/1-butene copolymer described in Example 1 is reacted with a monohydroxy poly(ethylene glycol) (mol. wt. =750) according to the procedure of Example 2. The dispersion factor of the initial carboxylated polymer is zero and the dispersion factor of the hydrophylic reaction product is 0.28. The modified polymer is suitable for use as an adhesive for polyesters.

EXAMPLE 7

Highly crystalline poly-1-pentene is grafted according to the procedure of Example 1 to provide a polymer having a saponification number of 34.9 with a melt viscosity of 3415 cp. at 190°C. The dispersibility of this polymer in 2% NaOH at 70°C. is zero. The polymer is reacted (100, 50 and 20 mole %) according to the procedure of Example 2 with nonylphenoxypoly(ethyleneoxy)ethanol. The dispersibility of these products is comparable to that found in Example 2. However, this is a crystalline polymer with a melting point of 75°C. whereas the propylene/1-butene copolymers are amorphous, low softening polymers. Thus, the modified poly-1-pentene hydrophylic polymers are suitable adhesives for applications requiring higher use temperatures (higher pop-open temperature for example) than can be obtained with the low softening propylene/1-butene polymers.

EXAMPLE 8

Carboxylated polyethylene (Sap. No. = 16 and melt viscosity at 190°C. = 2000 cp.) is reacted with a monohydroxypolyether capped on one end with a methoxy group. The molecular weight of this compound is about 20,000. Before modification, the dispersibility of this polymer is zero. After 17.5% of the carboxyl groups have been reacted with the hydroxy compounds the dispersibility factor has increased to 0.69. The polymer is not crosslinked, is thermally stable and is suitable for use in antiskid coatings.

EXAMPLE 9

Amorphous polypropylene wax having a melt viscosity of 1000 cp. and a saponification number of 41 is modified (approximately 6% of potential carboxyl groups) as described in Example 8. The dispersion factor is 1.0 whereas the carboxylated polymer before modification has a dispersion factor of zero. This modified hydrophylic polypropylene is a dispersible hot-melt adhesive suitable for use with paper, corrugated board, polyesters, as a coating material and as an antiskid composition. This composition can also be used as a laminating adhesive to adhere paper-to-paper, paper-to-aluminum foil, aluminum-to-aluminum and polyolefin film-to-polyolefin film.

EXAMPLE 10

Semicrystalline polypropylene having a melt viscosity of 2000 cp. at 190°C. and a Saponification No. of 5 is reacted completely with a monohydroxypolyether having about 500 repeating ethyleneoxy groups by the procedure described in Example 2. The carboxylated polymer has a dispersion factor of zero whereas the reacted hydrophylic polymer has a dispersion factor of 0.49. The polymer is a dispersible adhesive for paper and corrugated boards requiring pop-open temperatures of 160°C. or higher.

EXAMPLE 11

The procedure of Example 2 is repeated with polypropylene having a saponification number of 110 and melt viscosity of 2100 cp. at 190°C. The carboxylated polymer has a dispersion factor of 0.07 whereas the modified polymer has a dispersion factor of 0.98.

Similar results are obtained with a polypropylene having a melt viscosity of 43,000 cp. at 190°C. and a saponification number of 115. The dispersed polymer is coated onto a glass substrate to form an antiskid coating and is suitable as a contact adhesive for polyesters.

EXAMPLE 12

Polypropylene with a melt viscosity of 1500 cp. at 190°C. and a saponification number of 60 is reacted completely with nonylphenoxypoly(ethyleneoxy)ethanol as described in Example 2. The modified polymer is applied as a hot-melt size to polyester spun yarn. After the yarn is processed and the size is no longer required, it is dissolved from the polyester yarn in a hot, dilute alkali bath.

EXAMPLE 13

The polypropylene described in Example 12 is dispersed in 2% alkali at 70°C. and applied to polypropylene filament as a water-dispersed size. The size adheres tenaciously to the polypropylene filament and promotes the adhesion and coverage of subsequent coatings of poly(vinyl chloride).

EXAMPLE 14

The procedure of Example 1 is followed to graft diethyl maleate to a propylene/1-butene copolymer having a melt viscosity of 2415 cp. at 190°C. The final vacuum stripped carboxylated polymer has a saponification number of 29.6 and a melt viscosity at 190°C. of 1330 cp. The dispersion factor is 0.06. The carboxylated polymer is reacted completely with nonylphenoxypoly(ethyleneoxy)ethanol according to the procedure of Example 2. This composition has a dispersion factor of 0.92 and is suitable for use as a repulpable hot melt adhesive for paper and corrugated board.

The polyolefin compositions of this invention are useful as adhesives for polyesters, as repulpable hot melt adhesives for use with paper and corrugated board, as antiskid compositions which can be applied from an aqueous dispersion, as a resealable battery case adhesive, as a melt size for spun and filament yarns which can later be removed by dispersing in water, as a water-dispersed size for polypropylene filament, as a base for an emulsified wax and as a hot melt adhesive for sandpaper to avoid the pollution hazard of solvents normally employed to apply the adhesive to the grit.

We claim:

1. Water-dispersible polyolefin compositions particularly useful as hot melt adhesive compositions for use on repulpable paper products comprising an esterified carboxylated polyolefin prepared by reacting a carboxylated polyolefin having a saponification number of from about 10 to about 160 with from 10 to 100 mole percent of monohydroxypolyether compounds of the formula:

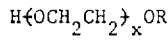

wherein R is a hydrocarbyl radical containing 1 to 24 carbon atoms and $x$ is an integer from 2 to 500.

2. Water-dispersible polyolefin compositions according to claim 1 wherein said carboxylated polyolefin is a maleated polyolefin prepared by reacting maleic anhydride and a polyolefin having a melt viscosity of from 500 to 50,000 centipoise at 190°C.

3. Water-dispersible polyolefin composition according to claim 2 wherein said polyolefin is a member of the group consisting of homopolymers prepared from alpha-olefin monomers having from 2 to 10 carbon atoms and copolymers prepared from at least two different alpha-olefin monomers having 2 to 10 carbon atoms.

4. Water-dispersible polyolefin composition according to claim 3 wherein said homopolymer is polyethylene having a density of from about 0.91 to about 0.98.

5. Water-dispersible polyethylene composition according to claim 4 wherein said polyethylene has a density of from about 0.92 to 0.96.

6. Water-dispersible polyolefin composition according to claim 3 wherein said homopolymer is poly-1-pentene.

7. Water-dispersible polyolefin composition according to claim 3 wherein said homopolyolefin is polypropylene.

8. Water-dispersible polypropylene composition according to claim 7 wherein said polypropylene is crystalline polypropylene.

9. Water-dispersible polypropylene composition according to claim 7 wherein said polypropylene is amorphous polypropylene.

10. Water-dispersible polyolefin composition according to claim 3 wherein said copolymer is a propylene/butene-1 copolymer containing 40–60 weight percent butene-1.

11. Water-dispersible polyolefin composition according to claim 1 wherein said carboxylated polyolefin is a maleated polyolefin prepared by reacting maleic anhydride and a polyolefin having a melt viscosity of from 1,000 to 2,500 centipoise at 190°C.

12. Water-dispersible polyolefin composition according to claim 11 wherein said monohydroxypolyether is a member of the group consisting of nonylphenoxypoly(ethyleneoxy)ethanol and ethoxylated stearyl alcohol (molecular weight 710).

13. Water-dispersible polyolefin composition according to claim 12 wherein said polyolefin is polyethylene having a density of 0.91 to 0.98.

14. Water-dispersible polyolefin composition according to claim 13 wherein said polyolefin is polyethylene having a density of 0.92 to 0.96.

15. Water-dispersible polyolefin composition according to claim 12 wherein said polyolefin is poly-1-pentene.

16. Water-dispersible polyolefin composition according to claim 12 wherein said polyolefin is polypropylene.

17. Water-dispersible polyolefin composition according to claim 16 wherein said polypropylene is crystalline polypropylene.

18. Water-dispersible polyolefin composition according to claim 16 wherein said polypropylene is amorphous polypropylene.

19. Water-dispersible polyolefin composition according to claim 12 wherein said copolymer is propylene/butene-1 containing 40–60 weight percent butene-1.